(12) United States Patent
Dutton

(10) Patent No.: US 12,487,342 B2
(45) Date of Patent: Dec. 2, 2025

(54) QUANTUM FILM DIRECT TIME OF FLIGHT SENSOR CIRCUIT FOR LOW COST SHORT WAVE INFRARED OPERATION

(71) Applicant: STMicroelectronics (Research & Development) Limited, Marlow (GB)

(72) Inventor: Neale Dutton, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 870 days.

(21) Appl. No.: 17/746,111

(22) Filed: May 17, 2022

(65) Prior Publication Data

US 2023/0375679 A1 Nov. 23, 2023

(51) Int. Cl.
*G01S 7/48* (2006.01)
*G01S 7/4865* (2020.01)
*G01S 7/487* (2006.01)
*G01S 7/497* (2006.01)

(52) U.S. Cl.
CPC .......... *G01S 7/4865* (2013.01); *G01S 7/4876* (2013.01); *G01S 7/497* (2013.01)

(58) Field of Classification Search
CPC ....... G01S 7/4865; G01S 7/4814; G01S 7/481
See application file for complete search history.

(56) References Cited

U.S. PATENT DOCUMENTS

| | | | |
|---|---|---|---|
| 5,537,000 A | 7/1996 | Alivisatos et al. | |
| 6,028,327 A | 2/2000 | Mizoguchi et al. | |
| 6,992,317 B2 | 1/2006 | Jain et al. | |
| 7,042,003 B2 | 5/2006 | Jang et al. | |
| 7,053,412 B2 | 5/2006 | Hack et al. | |
| 7,326,908 B2 | 2/2008 | Sargent et al. | |
| 7,750,561 B2 | 7/2010 | Aziz et al. | |
| 7,906,361 B2 | 3/2011 | Kim et al. | |

(Continued)

FOREIGN PATENT DOCUMENTS

| EP | 3298666 B1 | 12/2021 |
|---|---|---|
| WO | 2020021399 A1 | 1/2020 |

OTHER PUBLICATIONS

Imaging Sensing and Actuation / Infrared Sensing Technology / IMEC, 2022, 20 pages.

(Continued)

*Primary Examiner* — Tony Ko
(74) *Attorney, Agent, or Firm* — Crowe & Dunlevy LLC

(57) ABSTRACT

A time-of-flight system includes an emitter-circuit generating and directing pulses of light toward a target, and a receiver-circuit including a photodetector coupled between a bias node and a sensing node to detect pulses that have reflected off the target, a comparison circuit comparing a sense voltage at the sensing node to a reference, a timing measurement circuit measuring elapsed time between generation of a given pulse and detection thereof after reflection off the target, and a programmable current sink that sinks a current from the sensing node equal to a portion of a photocurrent generated by the photodetector due to detection of ambient light. A timing-generation circuit synchronizes generation of the pulses and measurement of elapsed time by the timing circuit. A processor adjusts a magnitude of the current sunk from the sensing node based upon output of the comparison circuit when the emitter circuit is deactivated.

20 Claims, 5 Drawing Sheets

(56) References Cited

U.S. PATENT DOCUMENTS

| | | |
|---|---|---|
| 7,915,701 B2 | 3/2011 | Forrest et al. |
| 8,101,941 B2 | 1/2012 | Choulis et al. |
| 8,405,028 B2 | 3/2013 | So |
| 8,563,850 B2 | 10/2013 | Farris, III et al. |
| 8,877,367 B2 | 11/2014 | Holme et al. |
| 8,889,468 B2 | 11/2014 | Lee |
| 8,907,206 B2 | 12/2014 | Lee |
| 8,975,509 B2 | 3/2015 | Barkhouse et al. |
| 9,190,458 B2 | 11/2015 | So et al. |
| 10,217,890 B2 | 2/2019 | Gessner et al. |
| 10,225,907 B2 | 3/2019 | Xu et al. |
| 10,756,285 B2 | 8/2020 | Xu et al. |
| 11,172,186 B2 | 11/2021 | Van Nieuwenhove et al. |
| 2002/0119297 A1 | 8/2002 | Forrest et al. |
| 2003/0127973 A1 | 7/2003 | Weaver et al. |
| 2004/0031965 A1 | 2/2004 | Forrest et al. |
| 2004/0031966 A1 | 2/2004 | Forrest et al. |
| 2004/0195572 A1 | 10/2004 | Kato et al. |
| 2005/0023975 A1 | 2/2005 | Lee et al. |
| 2005/0236556 A1 | 10/2005 | Sargent et al. |
| 2006/0097247 A1 | 5/2006 | Kim et al. |
| 2006/0188707 A1 | 8/2006 | Khang et al. |
| 2007/0051945 A1 | 3/2007 | Nakayama et al. |
| 2009/0242871 A1 | 10/2009 | Kobayashi et al. |
| 2010/0012817 A1 | 1/2010 | Vogel et al. |
| 2010/0065834 A1 | 3/2010 | Hammond |
| 2010/0181552 A1 | 7/2010 | So |
| 2010/0229921 A1 | 9/2010 | Farris, III et al. |
| 2012/0187295 A1 | 7/2012 | So et al. |
| 2013/0075761 A1 | 3/2013 | Akiyama |
| 2014/0070191 A1 | 3/2014 | So et al. |
| 2015/0001395 A1 | 1/2015 | So et al. |
| 2016/0072025 A1 | 3/2016 | Skipor et al. |
| 2016/0079316 A1 | 3/2016 | Zhou et al. |
| 2016/0343513 A1 | 11/2016 | Kinge et al. |
| 2017/0084776 A1 | 3/2017 | Gessner et al. |
| 2017/0117496 A1 | 4/2017 | Koh et al. |
| 2018/0054872 A1 | 2/2018 | Xu et al. |
| 2018/0315788 A1 | 11/2018 | Kuo et al. |
| 2018/0315883 A1 | 11/2018 | Bessonov et al. |
| 2019/0043925 A1 | 2/2019 | So et al. |
| 2019/0081263 A1 | 3/2019 | Park et al. |
| 2019/0393271 A1 | 12/2019 | So et al. |
| 2020/0053257 A1 | 2/2020 | Sreepathihalli et al. |
| 2020/0162097 A1 | 5/2020 | Venkataraman et al. |
| 2020/0389606 A1 * | 12/2020 | Petilli .................. G05D 1/0289 |
| 2020/0412980 A1 | 12/2020 | Agranov et al. |
| 2021/0111539 A1 | 4/2021 | Siala et al. |
| 2021/0177320 A1 | 6/2021 | Yoo et al. |
| 2021/0274148 A1 | 9/2021 | Pacala et al. |
| 2022/0085111 A1 | 3/2022 | Yajima et al. |
| 2022/0165797 A1 | 5/2022 | Steckel et al. |
| 2022/0393123 A1 | 12/2022 | Kubota et al. |
| 2025/0175723 A1 * | 5/2025 | Kobayashi ............. H04N 25/78 |

OTHER PUBLICATIONS

ST's Quantum Dot Sensor Set for Volume SWIR Imaging, Dec. 15, 2021, 9 pages.

Quantum Dots to Spark New SWIR Wave, Dec. 15, 2021, 9 pages.

Image Sensors for Low Cost Infrared Imaging and 3D Sensing, Apr. 30, 2020, 5 pages.

EPO Search Report and Written Opinion for counterpart EP Appl. No. 23171098.9, report dated Aug. 14, 2023, 11 pgs.

* cited by examiner

QUANTUM FILM DIRECT TIME OF FLIGHT SENSOR CIRCUIT FOR LOW COST SHORT WAVE INFRARED OPERATION

TECHNICAL FIELD

This disclosure is related to the field of direct time of flight sensor circuits for performing short wave infrared-based distance determination, in particular utilizing quantum film based emitters and sensors.

BACKGROUND

Time-of-flight systems are used to measure distance to a target. There are two general classifications of time-of-flight systems, namely direct and indirect. With direct time-of-flight systems, an emitter such as a laser diode (typically infrared) is driven with a pulsed drive current to cause it to emit a short laser pulse in a given direction. This laser pulse is reflected by an object present in that given direction, and a receiver with a detector receives and senses the reflected laser pulse. The receiver, with a proper timing reference, measures the elapsed time between emitting of the laser pulse and receipt of the reflected laser pulse. From this elapsed time, the distance to the object can be evaluated. Through the use of an array of receiving elements in the receiver, a three-dimensional map of the object can therefore be formed.

Time-of-flight systems used to form a three-dimensional map of a human face are in commercial use to provide a quick way for computing systems, such as smartphones and tablets, to identify authorized users. It is commercially desirable for smartphones and tablets to have a high screen-to-body ratio, as users have been found to prefer the bezel of such devices to be small. Incorporating the emitters and detectors used by time-of-flight systems onto the front of such devices therefore presents a challenge, as such emitters and detectors are relatively large and would add to the bezel size of the device, yet it is desired for the bezel size to be small to increase screen-to-body ratio.

One way in which this has been addressed is to form a cut-out in the screen itself, permitting the placement of the emitter and detector on the front of the device while only increasing the size of the bezel in the vicinity of the emitter and detector. However, some users find such cut-outs to be unsightly. To that end, efforts have been made to position the emitter and detector under the screen so as to provide for the time-of-flight functionality for use in user authentication while maintaining a high screen-to-body ratio.

One issue with under-screen time-of-flight emitters is that such emitters typically emit 940 nm infrared light, some of which is absorbed by OLEDs in the display and re-emitted as white light, resulting in visible white dots appearing on the screen over the emitter. Thus, such under-screen time-of-flight emitters are not invisible to users.

To address this, attempts have been made at forming under-screen time-of-flight emitters that emit light at wavelengths that are not absorbed by OLEDs. For example, short-wave infrared (SWIR) light at 1380 nm and 1550 nm is not absorbed by OLEDs, and its emission by an under-screen time-of-flight emitter would therefore avoid the appearance of visible white dots on the screen. However, the materials used to form known SWIR emitters and detectors are substantially more expensive than the materials used to form 940 nm infrared emitters and detectors.

As such, further development into materials from which to form SWIR emitters and detectors is necessary.

A quantum dot (QD) is a nanometer-size particle of semiconductor material that exploits the phenomenon of quantum confinement to enable the creation of light emitters and photodetectors that operate at specific wavelengths. In particular, a quantum dot is formed of a semiconductor core with a diameter less than twice the exciton Bohr radius, and the specific diameter and material chosen for the semiconductor core sets the band gap of the semiconductor core (i.e., what portions of the electromagnetic spectrum the semiconductor core will absorb), with a shell surrounding the core to passivate and protect the core, and molecules extending from the shell to passivate, protect, and functionalize the semiconductor surface.

When a quantum dot is subjected to an electrical excitation corresponding to its band gap, electron-hole pairs are produced and recombine, producing light having a wavelength within the band gap. As such, quantum dots can be used in light emitters.

When a quantum dot is struck by an incoming photon within the band gap of its core, an electron-hole pair is formed, and the electron moves toward and is received by a sensing circuit, thereby completing detection of the photon. Quantum dots can therefore also be used in light detectors. Typically, the movement of the electron toward the sensing circuit is via carrier diffusion, and there is a delay on the order of microseconds between absorption of a photon and receipt of the electron at the sensing circuit. This delay between photon absorption and electron sensing, referred to as response time, does not present an issue when it is desired to use such quantum dots as proximity detectors, but does present an issue when attempting to use such quantum dots in time-of-flight detectors because the delay is too large and would greatly impact the accuracy of the timing measurements between light emission and reflected light detection.

As such, further development is desired, with the aim being a quantum dot based SWIR emitter and detector with a sufficiently quick response time and accompanying time-of-flight circuitry to enable the creation of an under-screen quantum dot based time-of-flight system.

SUMMARY

Disclosed herein is a time-of-flight ranging system, with an emitter circuit including a quantum-film based light emitter configured to generate and direct pulses of light toward a target, and a receiver circuit. The receiver circuit has a quantum-film based photodetector coupled between a bias node and a sensing node, the quantum-film based photodetector configured to detect pulses of the light that have reflected off the target. The receiver circuit also has a comparison circuit configured to compare a sense voltage at the sensing node to a reference voltage, a timing measurement circuit configured to measure elapsed time between generation of a given pulse of light by the quantum-film based light emitter and detection of that pulse of light after reflection off the target, and a programmable current sink configured to sink a current from the sensing node equal to a portion of a photocurrent generated by the quantum-film based photodetector due to detection of ambient light.

A timing generation circuit is configured to generate a timing reference to synchronize generation of the pulses of light and measurement of elapsed time by the timing circuit. A processor is configured to perform a calibration operation to adjust a magnitude of the current sunk from the sensing node based upon output of the comparison circuit when the emitter circuit is deactivated, and to generate ranging data based upon the measured elapsed times.

The quantum-film within the quantum-film based photodetector may be formed from quantum dots having cores of indium arsenide, and the quantum-film within the quantum-film based light emitter may be formed from quantum dots having cores of indium arsenide. The pulses of light generated by the emitter circuit may be in the short wave infrared spectrum.

The timing measurement circuit may be a time to digital converter.

The comparison circuit may include a comparator having an inverting terminal coupled to the reference voltage, a non-inverting terminal coupled to the sensing node, and an output coupled to the timing measurement circuit.

The programmable current sink may be a programmable current digital to analog converter (DAC) circuit, with the current sunk from the sensing node being set by a control signal provided to the programmable current DAC circuit by the processor.

During the calibration operation, the emitter circuit may be deactivated. In addition, the processor may be configured to: a) set the control signal to a pre-selected initial value at which it is expected that the current sunk from the sensing node would be less than the portion of the photocurrent generated by the quantum-film based photodetector that is due to detection of ambient light; b) if the comparator indicates that the sense voltage is greater than the reference voltage during exposure to ambient light, increment the control signal to cause the programmable current DAC to increment the current sunk from the sensing node; and c) if the comparator indicates that the sense voltage is not greater than the reference voltage during exposure to ambient light, end the calibration operation, and if not, return to b).

Also disclosed herein is a time-of-flight ranging system, including an emitter circuit including a quantum-film based light emitter configured to generate and direct pulses of light toward a target, and a receiver circuit. The receiver circuit includes a quantum-film based photodetector coupled between a bias node and an intermediate node, the quantum-film based photodetector configured to detect pulses of the light that have reflected off the target. The receiver circuit also includes a current-to-voltage converter coupled between the intermediate node and a sensing node, a comparison circuit configured to compare a sense voltage at the sensing node to a reference voltage, and a sample/hold circuit coupled to the intermediate node and the sensing node. The sample/hold circuit is configured to: during a calibration operation in which a portion of a photocurrent generated by the quantum-film based photodetector due to detection of ambient light is converted to a calibration voltage by the current-to-voltage converter, sample and hold the calibration voltage; and during normal operation, generate a current based upon the held calibration voltage and sink that current from the sensing node;

A timing generation circuit is configured to generate a timing reference to synchronize generation of the pulses of light and measurement of elapsed time by the timing circuit, and a processor is configured to control the sample/hold circuit during the calibration operation, and to generate ranging data based upon the measured elapsed times during normal operation.

The quantum-film within the quantum-film based photodetector may be formed from quantum dots having cores of indium arsenide, the quantum-film within the quantum-film based light emitter may be formed from quantum dots having cores of indium arsenide, and the pulses of light generated by the emitter circuit may be in the short wave infrared spectrum.

The comparison circuit may be a comparator having an inverting terminal coupled to the reference voltage, a non-inverting terminal coupled to the sensing node, and an output coupled to the timing measurement circuit. A reset switch may be arranged to reset the comparator based upon the output of the comparator.

The timing measurement circuit may be a time to digital converter.

The current-to-voltage circuit may be a transimpedance amplifier having a non-inverting terminal coupled to ground, an inverting terminal coupled to the intermediate node, and an output coupled to the sample/hold circuit, with a resistance being coupled between the inverting terminal and the output.

The sample/hold circuit may include a current sinking transistor, and a switch coupled between the sensing node and a control terminal of the current sinking transistor, the switch being controlled by the processor. A hold capacitor may be coupled between the control terminal of the current sinking transistor and ground. A current mirror may have an input coupled to a conduction terminal of the current sinking transistor and an output coupled to the intermediate node, the current mirror configured to sink the current based upon the held calibration voltage from the intermediate node during normal operation.

The processor may be configured to close the switch during the calibration operation and to open the switch during normal operation.

The current mirror may include: a first p-channel transistor having a source coupled to a supply voltage, a drain coupled to the intermediate node, and a gate; and a second p-channel transistor having a source coupled to the supply voltage, a gate coupled to the gate of the first p-channel transistor, and a drain coupled to the gate of the second p-channel transistor and to the conduction terminal of the current sinking capacitor.

The current sinking transistor may be an n-channel transistor having a drain coupled to the drain of the second p-channel transistor, a source coupled to ground, and a gate coupled to the switch and the hold capacitor, with the drain of the current sinking transistor being the conduction terminal thereof, and with the gate of the current sinking transistor being the control terminal thereof.

Also disclosed herein is a time-of-flight ranging system including an emitter circuit including a quantum-film based light emitter, the emitter circuit configured to generate and direct pulses of light toward a target, and a receiver circuit. The receiver circuit includes a quantum-film based photodetector coupled between a bias node and an intermediate node, the quantum-film based photodetector configured to detect pulses of the light that have reflected off the target. The receiver circuit also includes a comparison circuit configured to compare a sense voltage at the sensing node to a reference voltage, and a current-to-voltage converter coupled between the intermediate node and a sensing node, the current-to-voltage converter configured to self-adjust its gain and filter low frequency signals on the intermediate node such that a sensing voltage is formed at the sensing node that is representative of the pulses of the light that have reflected off the target and not representative of ambient light. A timing generation circuit is configured to generate a timing reference to synchronize generation of the pulses of light and measurement of elapsed time by the timing circuit, and a processor is configured to control the sample/hold circuit during the calibration operation, and to generate ranging data based upon the measured elapsed times during normal operation.

The quantum-film within the quantum-film based photodetector may be formed from quantum dots having cores of indium arsenide, and the quantum-film within the quantum-film based light emitter may be formed from quantum dots having cores of indium arsenide. The pulses of light generated by the emitter circuit may be in the short wave infrared spectrum.

The timing measurement circuit may be a time to digital converter.

The comparison circuit may be a comparator having an inverting terminal coupled to the reference voltage, a non-inverting terminal coupled to the sensing node, and an output coupled to the timing measurement circuit.

The current-to-voltage converter may include: a first transistor having a first conduction terminal coupled to a supply voltage, a second conduction terminal coupled to the intermediate node, and a control terminal coupled to an additional intermediate node; a second transistor having a first conduction terminal coupled to the supply voltage, a second conduction terminal coupled to the additional intermediate node, and a control terminal coupled to a first cascode control signal; a third transistor having a first conduction terminal coupled to the additional intermediate node, a second conduction terminal, and a control terminal coupled to a second cascode control signal; a fourth transistor having a first conduction terminal coupled to the second conduction terminal of the third transistor, a second conduction terminal coupled to ground, and a control terminal coupled to the intermediate node; a filtering capacitor coupled between the second intermediate node and the sensing nodel; and a fifth transistor having a first conduction terminal coupled to the sensing node, a second conduction terminal coupled to a bias voltage, and a gate coupled to a control terminal biasing voltage. The bias voltage may be equal to the reference voltage.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1:
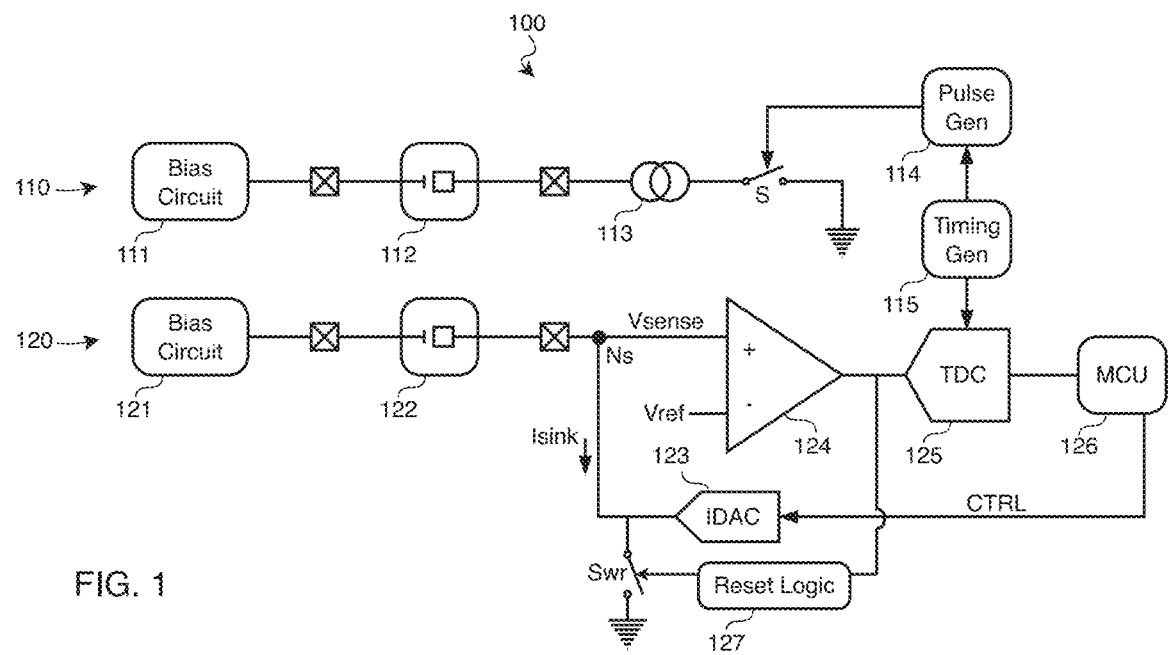
FIG. 1 is a block diagram of a first embodiment of a time-of-flight ranging system disclosed herein.

Disclosed herein with initial reference to FIG. 1 is a direct time-of-flight ranging system (TOF system) 100 including an emitter circuit 110 and a receiver circuit 120.

This embodiment is a discrete time embodiment, generally having lower power consumption than a continuous time embodiment would. The emitter circuit 110 includes a quantum film based electroluminator (QF electroluminator) 112. This QF electroluminator 112 is, relatively speaking, large and useful for applications where there is a single pixel or a small number of pixels.

The QF electroluminator 112 is connected between a bias circuit 111 and a current limiting cascode circuit 113. The bias circuit 111 may be a switch that connects the QF electroluminator 112 to a suitable bias voltage (e.g., 2-3 V), or may be a low dropout voltage regulator to provide a stable, independent, and particular bias voltage (e.g., 2-3 V) while rejecting power supply noise.

A switch S, under control of pulse generation circuitry 114, selectively connects the current limiting cascode circuit 113 to ground to thereby cause driving of the QF electroluminator 112 with a pulsed drive current, resulting in emission of short light pulses in the short-wave infrared (SWIR) spectrum range toward a target such as a user's face.

The receiver circuit 120 includes a quantum film based detector 122 connected between a bias circuit 121 and a sensing node Ns, the QF detector 122 being arranged to detect SWIR light. The bias circuit 121 may be a switch that connects the QF detector 122 to a suitable bias voltage (e.g., 2-3 V), or may be a low dropout voltage regulator to provide a stable, independent, and particular bias voltage (e.g., 2-3 V) while rejecting power supply noise.

A comparator 124 has a non-inverting terminal coupled to the sensing node Ns, an inverting terminal coupled to a reference voltage Vref, and an output connected to an input of a time-to-digital converter (TDC) circuit 125. The reference voltage Vref is generated by a bias generation block from a bandgap voltage, and is constant and global across each pixel. c A reset switch Swr is connected between the sensing node Ns and ground, and is operated based upon the output of the comparator 124. Optional reset logic 127 may in some embodiments control the reset switch Swr based upon the output of the comparator 124.

A timing generator 115 provides a timing reference signal to the pulse generation circuitry 114 and the TDC circuit 125. In operation, upon receipt of the timing reference signal, the pulse generator 114 briefly closes switch S, causing emission of a SWIR light pulse by the QF electroluminator 112; simultaneously with this operation, the TDC circuit 125 begins counting. When voltage Vsense at the sensing node Ns rises to become greater than the reference voltage Vref (which occurs when the SWIR light pulse has reflected off the target and returned to the QF detector 122), the comparator 124 asserts its output. The TDC circuit 125 measures the elapsed time between the receipt of the timing reference signal and assertion of the output of the comparator 124, which is representative of the elapsed time between the emission of the SWIR light pulse by the QF illuminator 112 and detection of the reflected light by the QF detector 122, and provides this elapsed time to the processor 126 as output, with the processor 126 being, for example, a digital signal processor for processing the output of the TDC 125. Since the speed of light is constant and known, from this elapsed time, the distance between the TOF system 100 and the target can be determined.

As is appreciated that, in operation, the timing reference is a periodic signal, and the pulse generator 114 therefore causes emission of numerous SWIR light pulses by the QF electroluminator 112, while the QF detector 122 registers detection of numerous reflected SWIR light pulses. Therefore, the different elapsed times determined by the TDC circuit 125 during operation are integrated over time by the MCU 126 to form a time-of-flight histogram from which a depth map can be generated and utilized by the MCU 126 or external hardware for desired functionality such as user verification.

Note that a programmable current sink, illustratively a current digital to analog converter (IDAC) circuit 123, sinks a current Isink (on the order of fA to nA) from the sensing node Ns. The magnitude of the current Isink that is sunk by the IDAC circuit 123 is set by a control signal CTRL received by the IDAC circuit 123 from the MCU 126. The purpose of this current subtraction is to remove the portion of the current output by the QF detector 122 that results from detection of ambient light, such that the voltage Vsense formed at the sensing node Ns is indicative of reflected SWIR pulses and not ambient light.

Figure 2:
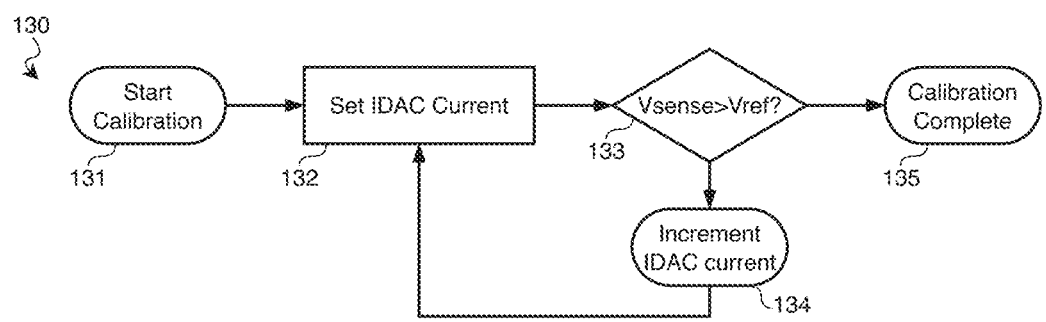
FIG. 2 is a flowchart showing operation of the time-of-flight ranging system of FIG. 1 in a calibration mode.

The determination of the value of the control signal CTRL for setting the current Isink to subtract ambient light is now described with additional reference to the flowchart 130 of FIG. 2. A calibration mode or phase is entered either at the beginning of operation or periodically (Block 131). During this calibration mode or phase, the switch S is kept open such that the QF electroluminator 112 is not emitting pulses of SWIR light, and therefore the output current of the QF detector 122 is representative of ambient light. A standard predetermined value of the control signal CTRL (e.g., a value at which it is expected that Isink is less than the contribution of ambient light to the current output by the QF electroluminator 112) is output by the MCU 126 to cause magnitude of the current Isunk sunk by the IDAC circuit 123 to be set to a standard predetermined magnitude (Block 132).

If the voltage Vsense at the sensing node Ns is greater than the reference voltage Vref, resulting in assertion of the output of the comparator 124 (Block 133), then the control signal CTRL is incremented so as to cause the IDAC 123 to increment the magnitude of the current Isink (Block 134). If the voltage Vsense at the sensing node Ns is less than the reference voltage Vref, resulting in deassertion of the output of the comparator 124 (Block 133), then the control signal CTRL is maintained at the current level and the calibration mode or phase is complete (Block 135)—therefore, the incrementation step at Block 134 is repeated until Vsense rises to become greater than the reference voltage Vref. Note that during this calibration mode or phase, the reset logic 127 blocks the reset switch Swr from being closed, and it therefore remains open during the calibration mode or phase.

Figure 3:
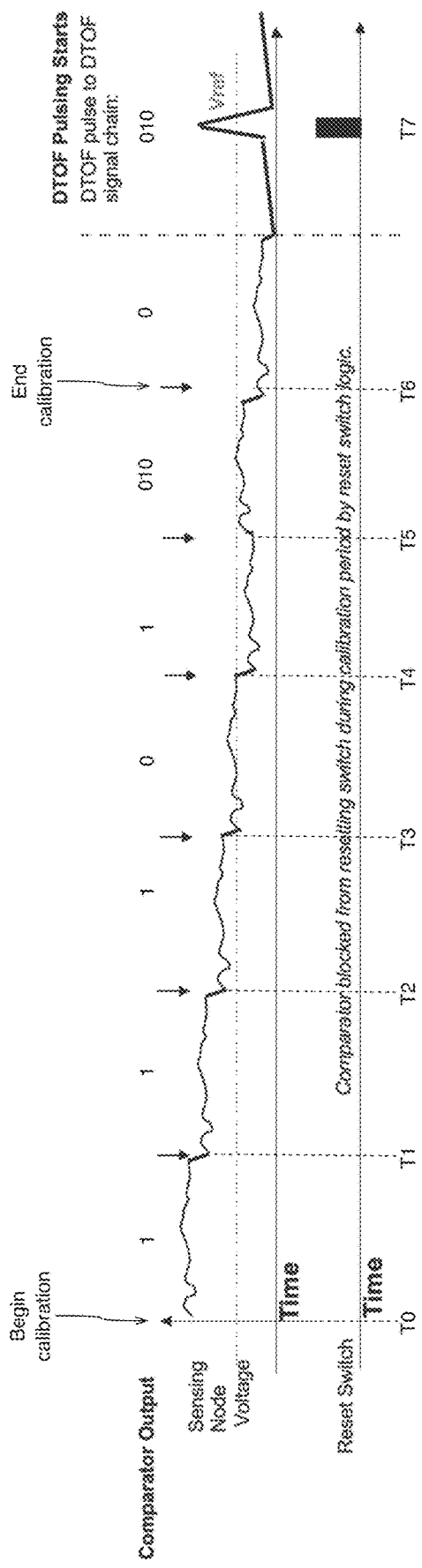
FIG. 3 is a graph of sense voltage vs. time of the time-of-flight ranging system of FIG. 1 in operation performing the calibration mode of FIG. 2.

A graph showing the current output by the QF detector 122 during this calibration mode or phase is shown in FIG. 3. Beginning at time T0, the magnitude of the current Isink is set to the standard predetermined value (Block 132), and the current output by QF detector 122 results in the voltage Vsense being greater than the reference voltage Vref (Block 133). At time T1, the magnitude of the current Isink sunk by the IDAC 123 is incremented (Block 134), with the result being that Vsense decreases in magnitude but is still greater than the reference voltage Vref (Block 133).

Therefore, at time T2, the magnitude of the current Isink sunk by the IDAC circuit 123 is incremented (Block 134), with the result being that the voltage Vsense decreases in magnitude but is still greater than the reference voltage Vref (Block 133). This incrementation (Block 134) and measurement (Block 133) is repeated until the incrementation of the magnitude of the current Isink results in the voltage Vsense falling below the reference voltage Vref (Block 133), which in this instance occurs at time T4. Then, a given period of time is waited to verify that noise does not cause the voltage Vsense to exceed the reference voltage Vref at the given magnitude of the current Isink. As can be observed, between times T4 and T5, the voltage Vsense is less than the reference voltage Vref, but between times T5 and T6, noise causes the voltage Vsense to rise above the reference voltage Vref. Therefore, at time T6, the magnitude of the current Isink sunk by the current DAC 123, is incremented (Block 134), with the result being that the voltage Vsense decreases in magnitude again to be below the reference voltage Vref. At this point, the magnitude of the current Isink has been properly set, ending the calibration (Block 135).

Also shown in FIG. 3 is the subsequent standard operation. At time T7, the timing reference signal is asserted and the emitter circuit 110 is activated, causing the switch S to close to thereby result in the QF illuminator 112 emitting a SWIR light pulse. Receipt of reflected SWIR light, not shown in FIG. 3, results in the voltage Vsense rising above the reference voltage Vref and the output of the comparator 124 being asserted, as shown. This assertion of the output of the comparator 124 causes the switch Swr to briefly close, resetting the comparator 124, since the reset logic 127 permits the passage of the output of the comparator 124 to control the switch Swr.

Figure 4:
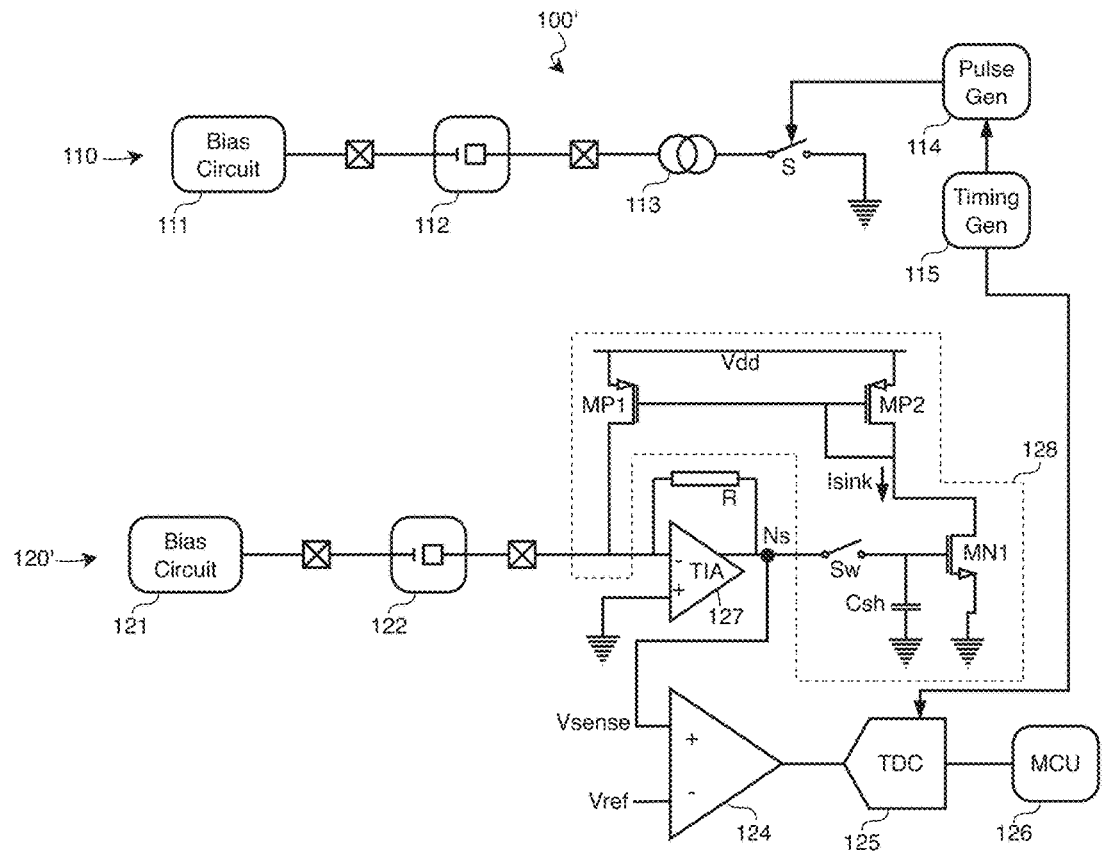
FIG. 4 is a block diagram of a second embodiment of a time-of-flight ranging system disclosed herein.

Now described with reference to FIG. 4 is a first continuous time embodiment.

The direct time-of-flight ranging system (TOF system) 100' includes an emitter circuit 110 and a receiver circuit 120'. The emitter circuit 110 remains generally unchanged from the above-described embodiment, with the exception being that the exception being that the QF electroluminator 112 here is, relatively speaking, small and for use in multiple-pixel applications where a detailed depth map of the target is to be formed, for example for user authentication.

The receiver circuit 120' includes a quantum film based detector 122 (QF detector) connected between a bias circuit 121 and the inverting input terminal of a transimpedance amplifier circuit 127 (TIA, which functions as a current to voltage converter and may have a fixed or adjustable gain), which has its non-inverting input terminal grounded. The output of the TIA circuit 127 is connected to the sensing node Ns, and a resistance R is connected between the inverting input terminal and the output of the TIA circuit 127.

The bias circuit 121 may be a switch that connects the QF detector 122 to a suitable bias voltage (e.g., 2-3 V), or may be a low dropout voltage regulator to provide a stable, independent, and particular bias voltage (e.g., 2-3 V) while rejecting power supply noise.

A sample/hold circuit 128 is connected between the inverting input terminal and the output of the circuit TIA 127 as well. The sample/hold circuit 128 includes p-channel transistors MP1 and MP2 connected in a current mirror arrangement, with transistor MP1 having its source connected to supply voltage Vdd and its drain connected to the non-inverting input terminal of TIA circuit 127, and transistor MP2 having its source connected to supply voltage Vdd and its gate connected to the gate of transistor MP1. An n-channel transistor MN1 has its drain connected to the drain of transistor MP2, its source connected to ground, and its gate selectively connected to the sensing node Ns by a switch Sw which is controlled by the processor 126. A sample/hold capacitor Csh is connected between the gate of transistor MN1 and ground.

A comparator 124 has a non-inverting terminal coupled to the sensing node Ns, an inverting terminal coupled to the reference voltage Vref, and an output connected to an input of the time-to-digital converter (TDC) circuit 125. The TDC circuit 125 receives the timing reference signal from the timing generator 115 and provides output to the MCU 126.

The sample/hold circuit 128 is utilized during a calibration mode or phase to configure the transistors MP1, MP2, and MN1 to sink a current Isink from the inverting input terminal of the TIA circuit 127 such that the contribution to the voltage Vsense at the sensing node Ns from the current generated by the QF detector 122 is removed.

Figure 5:
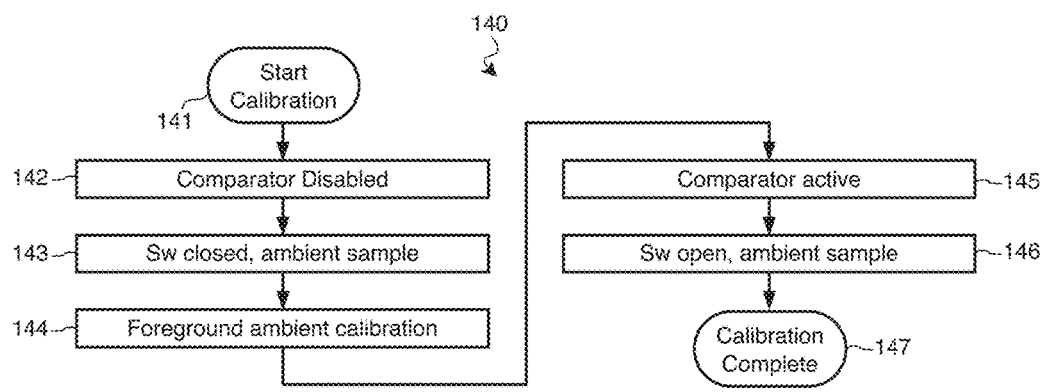
FIG. 5 is a flowchart showing operation of the time-of-flight ranging system of FIG. 4 in a calibration mode.

The current Isink is therefore set during the calibration mode or phase, which is now described in detail with additional reference to the flowchart 140 of FIG. 5.

A calibration mode or phase is entered either at the beginning of operation or periodically (Block 141), during which the comparator 124 is disabled (Block 142) and the switch S is kept open such that the QF electroluminator 112 is not emitting pulses of SWIR light and the output current of the QF detector 122 is representative of ambient light. Then, switch Sw is closed, with the result being that the TIA circuit 127 converts the output current of the QF detector 122 to the voltage Vsense at the sensing node Ns. The voltage Vsense is stored across the capacitor Csh; therefore the capacitor Csh has sampled a voltage representative of the contribution of ambient light to the output of the QF detector 122 (Block 143). Since the voltage across the capacitor Csh is applied to the gate of transistor MN1, the current Isink that is sunk by the transistor MN1 is representative of the contribution of ambient light to the output current produced by the QF detector 122 (Block 144). The comparator 124 is then activated (Block 145) and the switch Sw is opened (Block 146), holding the previously measured value of Vsense on the capacitor Csh and configuring the receiver circuit 120' for normal operation, with current Isink being set based upon the voltage across the capacitor Csh. This ends the calibration mode or phase (Block 147), and time-of-flight sensing can be performed as described above.

Figure 6:
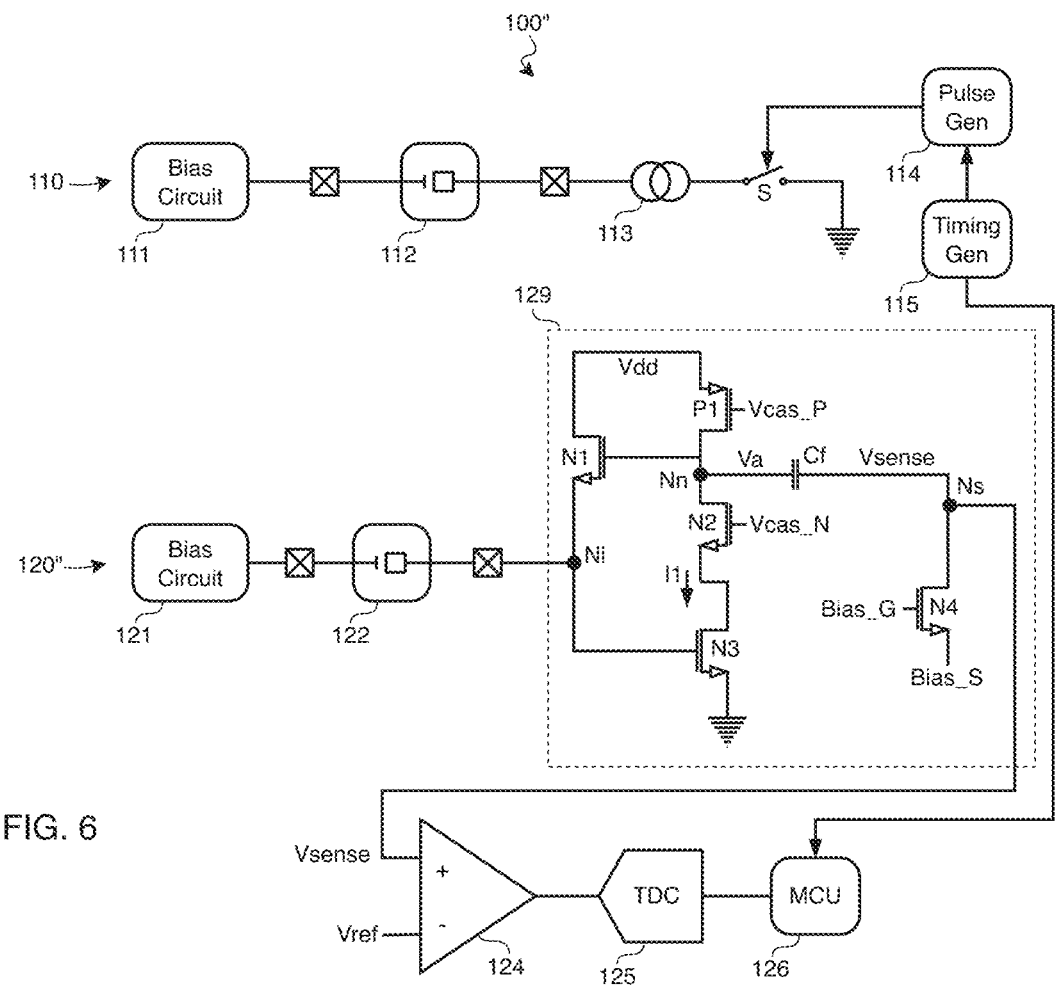
FIG. 6 is a block diagram of a third embodiment of a time-of-flight ranging system disclosed herein.

Now described with reference to FIG. 6 is a second continuous time embodiment. The direct time-of-flight ranging system (TOF system) 100" includes an emitter circuit 110 and a receiver circuit 120". The emitter circuit 110 remains unchanged from the above-described embodiment.

The receiver circuit 120" includes a quantum film based detector 122 (QF detector) connected between a bias circuit 121 and an input of an logarithmic self-biased transimpedance amplifier circuit 129 (self-biased TIA), the self-biased TIA circuit 129 having an output connected to the sensing nose Ns. The bias circuit 121 may be a switch that connects the QF detector 122 to a suitable bias voltage (e.g., 2-3 V), or may be a low dropout voltage regulator to provide a stable, independent, and particular bias voltage (e.g., 2-3 V) while rejecting power supply noise.

The input of the self-biased TIA circuit 129 is connected to the QF detector 122 at node Ni. The self-biased TIA circuit 129 includes a first n-channel transistor N1 having its drain connected to the supply node Vdd, its source connected to node Ni, and its gate connected to node Va. A first p-channel transistor P1 has its source connected to the supply node Vdd, its drain connected to node Nn, and its gate coupled to receive a first cascode control signal Vcas_P. A second n-channel transistor N2 has its drain connected to node Nn, its source connected to the drain of third n-channel transistor N3, and its gate coupled to receive a second cascode control signal Vcas_N. The third n-channel transistor N3 has its source connected to ground and its gate connected to node Ni. A fourth n-channel transistor N4 has its drain connected to the sensing node Ns, its source connected to a bias voltage Bias_S, and its gate connected to a bias voltage Bias_G. A capacitor Cf is connected between nodes Nn and Ns.

A comparator 124 has a non-inverting terminal coupled to the sensing node Ns, an inverting terminal coupled to the reference voltage Vref, and an output connected to an input of the time-to-digital converter (TDC) circuit 125. The TDC circuit 125 receives the timing reference signal from the timing generator 115 and provides output to the MCU 126.

The self-biased TIA circuit 129 is configured to set its gain and thereby compensate for low frequency signals such as ambient light while passing high frequency signals such as SWIR pulses.

In particular, during operation, the n-channel transistor N1 is biased into the linear region of operation, acting as a resistance, thereby producing a voltage at node Ni. N-channel transistor N3 acts as an amplifier controlled by the voltage at node Ni, converting that voltage by the transconductance to a current I1. The cascode control voltages Vcas_P and Vcas_N respectively bias the p-channel transistor P1 and n-channel transistor N2 into the linear region of operation so that P1 and N2 act as resistors, with a voltage Va being generated at node Nn from the current I1. Collectively, this operation forms a slow loop that attempts to force the node Ni to a substantially constant voltage. As a result, the DC component of the voltage Va is at a substantially constant level, and shifts in the level thereof are slow. As such, the capacitor Cf blocks the DC component from the voltage Va while passing high frequency components of the voltage Va which result from detection of reflected SWIR light pulses by the QF detector 122. The bias voltage Bias_G is set so that the n-channel transistor N4 is maintained in the linear mode of operation to act as a resistor, and the bias voltage Bias_S is set to the reference voltage of the comparator 124. As a result of this, the capacitor Cf and transistor N4 (acting as a resistor) form a high pass filter such that the voltage Vsense output to the sensing node Ns has had contributions from ambient light removed, and time-of-flight sensing can be performed as described above.

Figure 7:
FIG. 7 is a graph of the time-of-flight ranging system of FIG. 6 showing DC offset removal from the sense voltage.

Sample waveforms of the voltages Va and Vsense during detection of a SWIR light pulse are shown in FIG. 7. The effect of the bias voltage Bias_S can be observed in the difference between the voltage Va and Vsense, with Vsense having being filtered and its DC offset removed.

Figure 8:
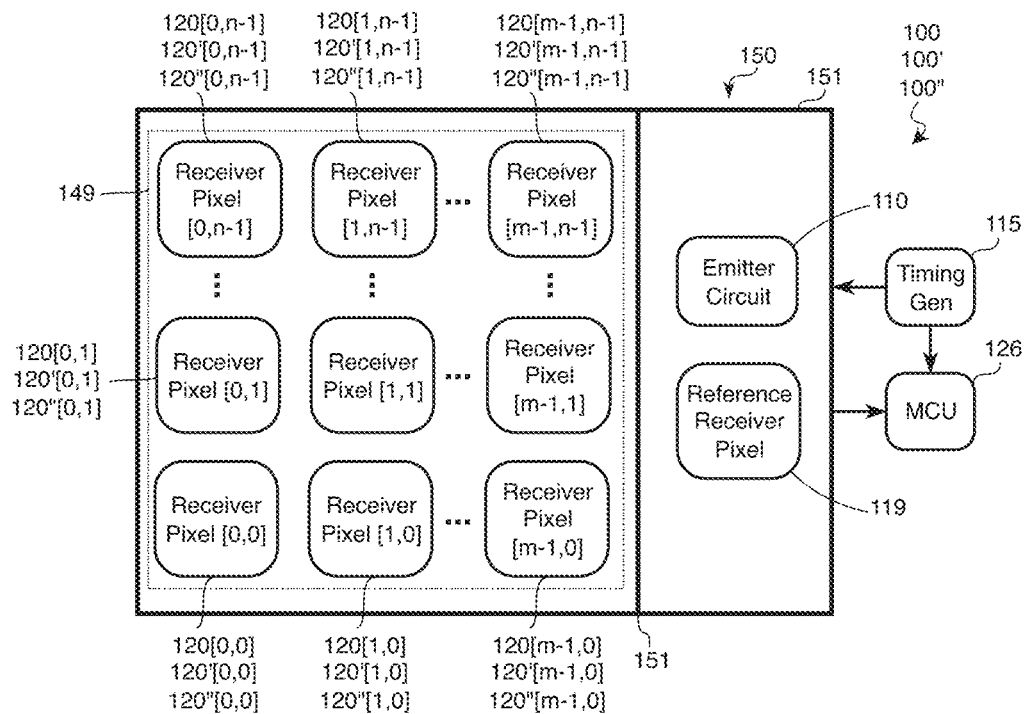
FIG. 8 is a block diagram of a time-of-flight sensor using the emitter and receiver circuits of FIG. 1, 4, or 6.

The above TOF systems 100, 100', 100" are described with reference to a single receiver circuit 120, 120', 120", but it should be understood that such TOF systems may include a one-dimensional or two-dimensional array of such receiver circuits (pixels). Shown in FIG. 8 is a time-of-flight (TOF) sensor 150 incorporated into a package 151. The TOF sensor 150 includes an emitter circuit 110 as described above and a reference receiver circuit 119 that has the structure and function of one of the receiver circuits 120, 120', 120" described above. The TOF sensor 150 also includes an M by N array of return receiver circuits (pixels) 149, each of which has the structure and function of one of the receiver circuits 120, 120', 120" described above.

The package 151 includes an optical barrier between the emitter circuit 110 and the array of return receiver pixels 149 so that SWIR light pulses emitted by the emitter circuit 110 do not travel directly to the receiver pixels 149, and instead strike the receiver pixels 149 after reflection off a target. The reference receiver pixel 119 is positioned such that SWIR pulses emitter by the emitter circuit 110 do in fact travel directly thereto. The elapsed time between emission of a SWIR pulse and receipt thereof by the reference receiver pixel 119 indicates the response time of the TOF sensor 150, and this response time is compensated for when performing TOF sensing of a scene.

Figure 9:
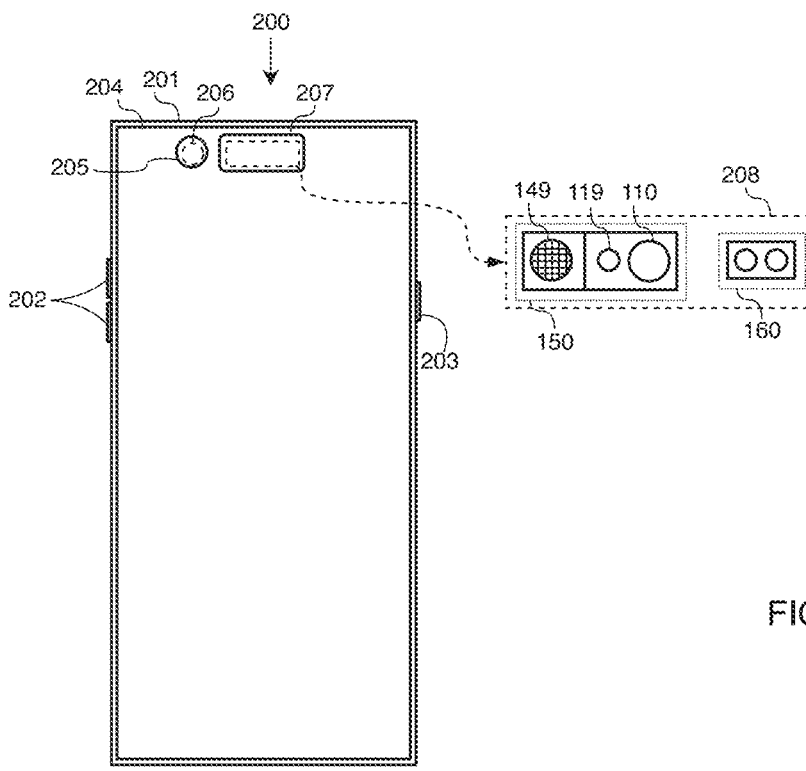
FIG. 9 is a diagrammatical representation of a smartphone utilizing the time-of-flight sensor of FIG. 8.

The specific application of the TOF sensor 150 described herein for use in a smartphone 200 is now described with reference to FIG. 9. The smartphone 200 includes a housing 201, with buttons 202 and 203 on opposite sides of the housing 201. A touch sensitive display screen 204 is positioned within the housing 201 on the front face of the housing 201. The touch sensitive display screen 204 may be an organic light emitting diode (OLED) or micro-LED based touch screen, and has one or more holes or cutouts defined therein. In the illustrated example, the touch sensitive display 204 has two cutouts 205 and 207 defined therein. A camera sensor 206 is positioned within the cutout 205, and sensor package 208 is positioned within the cutout 207. The sensor package 208 includes the TOF sensor 150 described above, as well as a proximity sensor and autofocus unit 160.

Any QF detectors 122 sensitive to the SWIR range and having a sufficiently fast response time (e.g., 300 ps) are usable in the above-described embodiments. Likewise, any QF electroluminators 112 capable of emitting short pulses in the SWIR range are usable in the above described embodiments.

The usable QF detectors 122 and QF electroluminators 112 utilize quantum films formed from nanoparticles having a semiconductor cores with a shell surrounding each semiconductor core, the semiconductor chores having their sizes, shapes, and materials chosen so as to detect and emit desired wavelengths of light (e.g., SWIR). The nanoparticles include ligands, organic aliphatics, organometallic, or inorganic molecules that extend from their shell and passivate, protect, and functionalize the quantum films so formed.

The nanoparticles may be quantum dots with substantially spherical cores. The nanoparticles may also be quantum wires, or quantum rods, with cylindrically shaped cores. The nanoparticles may also be quantum wells, with parallelepiped shaped cores. The cores may be formed from a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si. The shell may be, for example, made of a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si. The choice of the materials depends on the desired wavelength of light to be emitted and sensed. The dimensions of the cores are smaller than 20 nm, for example in the range from 2 to 15 nm. In particular, in the case of quantum dots, the diameter of each quantum dot may be in the range from 2 to 15 nm.

Further details of usable QF electroluminators 112 and QF detectors 122 are contained within U.S. application Ser. No. 17/531,309, filed Nov. 19, 2021, assigned to the same Assignee as this Application, the contents of which are incorporated by reference in their entirety to the maximum extent allowable under the law.

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A time-of-flight ranging system, comprising:
an emitter circuit including a quantum-film based light emitter configured to generate and direct pulses of light toward a target;
a receiver circuit comprising:
    a quantum-film based photodetector coupled between a bias node and a sensing node, the quantum-film based photodetector configured to detect pulses of the light that have reflected off the target;
    a comparison circuit configured to compare a sense voltage at the sensing node to a reference voltage;
    a timing measurement circuit configured to measure elapsed time between generation of a given pulse of light by the quantum-film based light emitter and detection of that given pulse of light after reflection off the target; and
    a programmable current sink configured to sink a current from the sensing node equal to a portion of a photocurrent generated by the quantum-film based photodetector due to detection of ambient light;
a timing generation circuit configured to generate a timing reference to synchronize generation of the pulses of light and measurement of elapsed time by the timing measurement circuit; and
a processor configured to perform a calibration operation to adjust a magnitude of the current sunk from the sensing node based upon output of the comparison circuit when the emitter circuit is deactivated, and to generate ranging data based upon the measured elapsed time.

2. The time-of-flight ranging system of claim 1, wherein a quantum-film within the quantum-film based photodetector is formed from quantum dots having cores comprising indium arsenide; wherein a quantum-film within the quantum-film based light emitter is formed from quantum dots having cores comprising indium arsenide; and wherein the pulses of light generated by the emitter circuit are in a short wave infrared spectrum.

3. The time-of-flight ranging system of claim 1, wherein the timing measurement circuit comprises a time to digital converter.

4. The time-of-flight ranging system of claim 1, wherein the comparison circuit comprises:

a comparator having an inverting terminal coupled to the reference voltage, a non-inverting terminal coupled to the sensing node, and an output coupled to the timing measurement circuit; and a reset switch configured to reset the comparator based upon the output of the comparator.

5. The time-of-flight ranging system of claim 4, wherein the programmable current sink comprises a programmable current digital to analog converter (DAC) circuit, with the current sunk from the sensing node being set by a control signal provided to the programmable current DAC circuit by the processor.

6. The time-of-flight ranging system of claim 5, wherein, during the calibration operation:

the emitter circuit is deactivated; and the processor is configured to:

a) set the control signal to a pre-selected initial value at which it is expected that the current sunk from the sensing node would be less than the portion of the photocurrent generated by the quantum-film based photodetector that is due to detection of ambient light;

b) when the comparator indicates that the sense voltage is greater than the reference voltage during exposure to ambient light, increment the control signal to cause the programmable current DAC circuit to increment the current sunk from the sensing node; and c) when the comparator indicates that the sense voltage is not greater than the reference voltage during exposure to ambient light, end the calibration operation, and if not, return to b).

7. A time-of-flight ranging system, comprising:

an emitter circuit including a quantum-film based light emitter configured to generate and direct pulses of light toward a target;

a receiver circuit comprising:

a quantum-film based photodetector coupled between a bias node and an intermediate node, the quantum-film based photodetector configured to detect pulses of the light that have reflected off the target;

a current-to-voltage converter coupled between the intermediate node and a sensing node;

a comparison circuit configured to compare a sense voltage at the sensing node to a reference voltage;

a sample/hold circuit coupled to the intermediate node and the sensing node, the sample/hold circuit configured to:

during a calibration operation in which a portion of a photocurrent generated by the quantum-film based photodetector due to detection of ambient light is converted to a calibration voltage by the current-to-voltage converter, sample and hold the calibration voltage; and during normal operation, generate a current based upon the held calibration voltage and sink that current from the sensing node;

a timing generation circuit configured to generate a timing reference to synchronize generation of the pulses of light and measurement of elapsed time by a timing measurement circuit; and a processor configured to control the sample/hold circuit during the calibration operation, and to generate ranging data based upon the measured elapsed time during normal operation.

8. The time-of-flight ranging system of claim 7, wherein a quantum-film within the quantum-film based photodetector is formed from quantum dots having cores comprising indium arsenide; wherein a quantum-film within the quantum-film based light emitter is formed from quantum dots having cores comprising indium arsenide; and wherein the pulses of light generated by the emitter circuit are in a short wave infrared spectrum.

9. The time-of-flight ranging system of claim 7, wherein the comparison circuit comprises a comparator having an inverting terminal coupled to the reference voltage, a non-inverting terminal coupled to the sensing node, and an output coupled to the timing measurement circuit.

10. The time-of-flight ranging system of claim 7, wherein the timing measurement circuit comprises a time to digital converter.

11. The time-of-flight ranging system of claim 7, wherein the current-to-voltage converter comprises a transimpedance amplifier having a non-inverting terminal coupled to ground, an inverting terminal coupled to the intermediate node, and an output coupled to the sample/hold circuit, with a resistance being coupled between the inverting terminal and the output.

12. The time-of-flight ranging system of claim 11, wherein the sample/hold circuit comprises:

a current sinking transistor;

a switch coupled between the sensing node and a control terminal of the current sinking transistor, the switch being controlled by the processor;

a hold capacitor coupled between the control terminal of the current sinking transistor and ground; and a current mirror having an input coupled to a conduction terminal of the current sinking transistor and an output coupled to the intermediate node, the current mirror configured to sink the current based upon the held calibration voltage from the intermediate node during normal operation.

13. The time-of-flight ranging system of claim 12, wherein the processor is configured to close the switch during the calibration operation and to open the switch during normal operation.

14. The time-of-flight ranging system of claim 12, wherein the current mirror comprises:

a first p-channel transistor having a source coupled to a supply voltage, a drain coupled to the intermediate node, and a gate; and a second p-channel transistor having a source coupled to the supply voltage, a gate coupled to the gate of the first p-channel transistor, and a drain coupled to the gate of the second p-channel transistor and to the conduction terminal of the current sinking transistor.

15. The time-of-flight ranging system of claim 14, wherein the current sinking transistor comprises an n-channel transistor having a drain coupled to the drain of the second p-channel transistor, a source coupled to ground, and a gate coupled to the switch and the hold capacitor, with the drain of the current sinking transistor being the conduction terminal thereof, and with the gate of the current sinking transistor being the control terminal thereof.

16. A time-of-flight ranging system, comprising:

an emitter circuit including a quantum-film based light emitter, the emitter circuit configured to generate and direct pulses of light toward a target;

a receiver circuit comprising:

a quantum-film based photodetector coupled between a bias node and an intermediate node, the quantum-film based photodetector configured to detect pulses of the light that have reflected off the target;

a current-to-voltage converter coupled between the intermediate node and a sensing node, the current-to-voltage converter configured to self-adjust its gain and filter low frequency signals on the intermediate node such that a sensing voltage is formed at the sensing node that is representative of the pulses of the light that have reflected off the target and not representative of ambient light; and a comparison circuit configured to compare a sense voltage at the sensing node to a reference voltage;

a timing generation circuit configured to generate a timing reference to synchronize generation of the pulses of light and measurement of elapsed time by a timing measurement circuit; and a processor configured to generate ranging data based upon the measured elapsed time during normal operation.

17. The time-of-flight ranging system of claim 16, wherein a quantum-film within the quantum-film based photodetector is formed from quantum dots having cores comprising indium arsenide; wherein a quantum-film within the quantum-film based light emitter is formed from quantum dots having cores comprising indium arsenide; and wherein the pulses of light generated by the emitter circuit are in a short wave infrared spectrum.

18. The time-of-flight ranging system of claim 16, wherein the timing measurement circuit comprises a time to digital converter.

19. The time-of-flight ranging system of claim 16, wherein the comparison circuit comprises a comparator having an inverting terminal coupled to the reference voltage, a non-inverting terminal coupled to the sensing node, and an output coupled to the timing measurement circuit.

20. The time-of-flight ranging system of claim 16, wherein the current-to-voltage converter comprises:

a first transistor having a first conduction terminal coupled to a supply voltage, a second conduction terminal coupled to the intermediate node, and a control terminal coupled to an additional intermediate node;

a second transistor having a first conduction terminal coupled to the supply voltage, a second conduction terminal coupled to the additional intermediate node, and a control terminal coupled to a first cascode control signal;

a third transistor having a first conduction terminal coupled to the additional intermediate node, a second conduction terminal, and a control terminal coupled to a second cascode control signal;

a fourth transistor having a first conduction terminal coupled to the second conduction terminal of the third transistor, a second conduction terminal coupled to ground, and a control terminal coupled to the intermediate node;

a filtering capacitor coupled between the second intermediate node and the sensing nodel; and a fifth transistor having a first conduction terminal coupled to the sensing node, a second conduction terminal coupled to a bias voltage, and a gate coupled to a control terminal biasing voltage;

wherein the bias voltage is equal to the reference voltage.

* * * * *